United States Patent [19]

Simeonov et al.

[11] 4,134,773

[45] Jan. 16, 1979

[54] METHOD OF ACCELERATED HARDENING AND STRENGTH-INCREASING OF DIFFERENT CEMENTS

[75] Inventors: Yordan T. Simeonov; Nikola B. Djabarov, both of Sofia, Bulgaria

[73] Assignee: Centralna Laboratoria Po Physiko-Chimicheska Mechanika pri Ban, Sofia, Bulgaria

[21] Appl. No.: 839,044

[22] Filed: Oct. 3, 1977

[30] Foreign Application Priority Data

Mar. 11, 1977 [BG] Bulgaria .................... 35651

[51] Int. Cl.$^2$ ............................... C04B 7/35
[52] U.S. Cl. ............................ 106/89; 106/314
[58] Field of Search ................... 106/89, 314, 315

[56] References Cited

U.S. PATENT DOCUMENTS

| | | | |
|---|---|---|---|
| 1,006,725 | 10/1911 | Cramer | 106/89 |
| 1,782,471 | 11/1930 | Kirchner | 106/89 |
| 3,210,207 | 10/1965 | Dodson et al. | 106/315 |
| 3,329,517 | 7/1967 | Dodson et al. | 106/315 |
| 3,427,175 | 2/1969 | Angstadt et al. | 106/315 |
| 3,801,338 | 4/1974 | Whitaker | 106/315 |

*Primary Examiner*—James Poer
*Attorney, Agent, or Firm*—E. Janet Berry; Lawrence Rosen

[57] ABSTRACT

A method for accelerating the hardening and increasing the strength of cements, including cement pastes, cement-sand mortars and concretes, which comprises mixing the cements with water plus an admixture at a temperature up to 60° C., and thereafter allowing the mixture to harden at a temperature up to 100° C. The admixture used comprises bialuminium pentahydroxychloride, gypsum, lime and alkali or alkaline earth nitrite.

The method is applicable to different kinds of cement, such as rapid hardening cement, slag-cement, pozzolana-cement and belite-cement.

7 Claims, No Drawings

METHOD OF ACCELERATED HARDENING AND STRENGTH-INCREASING OF DIFFERENT CEMENTS

The invention is related to a method of accelerated hardening and strength-increasing of different cements, including cement-pastes, cement-sand mortars and concretes. The invention can find its application in the field of monolith & prefabricated constructions and in the manufacturing of building materials, elements and products.

There are many well-known methods of accelerated hardening of cements, which comprise the use of accelerating admixtures, with or without preheating of the concrete batch to 50°-60° C., with or without steaming the concrete at 80°-100° C.

For the range of rapid-hardening cements (RHC) are already known the following accelerating admixtures: calcium cloride, natrium chloride, natrium sulphate, potassium sulphate, calcium nitrate, natrium chloride + natrium nitrite, calcium chloride + natrium nitrite calcium nitrate + calcium nitrite and calcium nitrite + calcium nitrate + calcium chloride.

For the slag-portland cement, the same admixtures are used as well as ferro chloride, the aluminium chloride, the natrium nitrite, or the magnesium sulphate + natrium nitrate.

For the portland -pozzdana cement the aforesaid accelerating additives are used, as well as the potassium and natrium carbonates.

In order to accelerate the hydratation of the belite-cement, an addition of calcium chloride + gypsum is thoroughly recommended.

The drawback of the known methods to accelerate the cement hardening lies in the unsufficient strength-increase at the early stage, i.e. 1,1 to 1,6 times only.

Another drawback is that according to some of these methods, the cement-strength at a later stage is lower than that of the cements which are admixtureless batched/or mixed.

Besides that, the most effective of yet known additions feature a high-chlorine-content, 64 percent of the calcium-chloride weight, 80% of the weight of aluminium chloride etc. This of course, considerably restricts the field of their application.

Again, a substantial drawback is that most of the admixtures used are hygroscopic, what makes their preliminary dry-mixing with cement impossible, since well before its use, particulary after a lomg storage, the cement gets gets moistened and its quality lowered.

The scope of this invention is to remove all said drawbacks, by elaborating a method of an accelerated hardening and strength-increasing of cements, wherein the hardening-process is accelerated, the strength is increased at an early and a later stage, and, the method itself may be spread over a large field of application.

This problem has been resolved by elaborating a method of accelerated hardening and strength-increasing of cements, including cement-pastes, cement-sand mortars and concretes wherein the following admixtures are used: 0,5 to 5 weight parts of bialuminium pentahydroxichloride, 1 to 12 weight parts of gypsum (semihydrate or bihydrate), 0,5 to 20 w.p. of lime (hydrated or unslacked) and up to 3 w.p. of nitrite (natrium nitrite or alkali-earth nitrite). The so dosed admixture is supplied to 100 w.p. of cement by means of the mixing-water or by means of the preliminary dry-mixing and good homogenization.

The preparation of the cement-pastes, the cement-sand mortars and concretes can be implemented at a temperature of the surrounding medium or after a preheating at 30° to 90° C., preferably at 30° to 50° C. After forming, the hardening can be achieved at an envirromental temperature or at 30° to 100° C. but preferably at 50° to 90° C.

The method described can be applied either to rapid-hardening cements (RHC), or to slow-hardening ones as slag, pozzolana, belite-cements, but bearing in mind that the RHC features a lower lime-content, i.e. 0,5 to 5 w.p's, while the slow-hardening cements require an increased lime-component, that is, from 2 to 20 weight parts.

The advantage of the invention is the accelerated hardening of cements, as their strength at the early stage rises up to 1,6–5,5 times at conventional temperature (20° C. and lower) and 1,5 to 3,5 times by warming up the concrete mixture or heat-treatment — even at 50° C. only.

Besides that, at a later stage the strength not only remains stable, but trends to increase in view of cements to which this method is not applied.

Another important advantage is that the clorine inserted represents a very small quantity, that is only 2 to 4% of the total admixture-weight, and, in addition, the admixture-medium is strongly alkaline-. Compared to the most effective accelerating admixture the chlore is from 16 to 32 times lesser in view of the calcium chloride and 20 to 40 times-in view of the aluminium cloride, all of which have acid medium. The inclusion of the nitrite into the admixture, which, as an inhibitor does neutralize the action of this minimal chlorine-quantity, results in the broadening of the method's application-field for different brands of steel-reinforced concrete. On the other hand, the nitrite plays an important role in the additional szrength-increase of the cements.

Finally, a last substantial advantage is that the admixture is not hygroscopic and can be preliminary mixed with said cement, e.g. at its initial milling. The so prepared cement (admixture included) is not moisture-attacked, hence it does not worsen its inherent quality prior to use.

For a better comprehension of the invention, the following examples are cited:

EXAMPLE 1

For a batch of 100 w.p. of RHC, slag- or belite-cement, 2 w.p. of bialuminium pentahydroxichloride are dosed, which are the dissolved in the mixing-water and to this mixture 4 w.p. (for the belite-cement — 4 w.p. of hydrate lime) of semihydrate gypsum and 2 w.p. hydrate lime are successively added. To one half of the batch, together with the bialuminium pentahydrochloride, about 0,22 weight parts of natrium nitrite are also added. With thus obtained mixtures, appropriate cement-sand mortars are stirred, having a cement-sand ratio of 1:3 and a water-cement ratio of 0,5. By means of a jolting table, prisms sized 4 × 4 × 16 centimeters are formed. After their unmoulding they are underwater set at 20° C. unless their testing term expires. For comparison, the same way is applied for the preparing of cement-sand mortar prisms, but admixtureless mortars are nereby used. The experimental data obtained are shown on Table 1. It is seen there from, that the inserting of natrium nitrite is even accelerating the hardening process - in the case of belite-cements for example.

TABLE 1

Compression strength of 1:3 cement/sand mortar with water/cement ratio of 0,5, with or without including natrium nitrite into the admixture

| Compound | 1 day kgf/cm² | % | 3 days kgf/cm² | % | 28 days kgf/cm² | % |
|---|---|---|---|---|---|---|
| RHC | 159,1 | 100,0 | — | — | 543,1 | 100,0 |
| RHC with nitriteless admixture | 293,2 | 184,3 | — | — | 635,9 | 117,1 |
| RHC | 168,3 | 100,0 | 370,5 | 100,0 | 527,2 | 100,0 |
| RHC with admixture + nitrite | 307,5 | 182,7 | 488,7 | 131,9 | 634,0 | 120,3 |
| SC | 37,0 | 100,0 | 110,2 | 100,0 | 359,6 | 100,0 |
| SC with nitriteless admixture | 60,7 | 164,1 | 181,7 | 164,9 | 447,6 | 124,5 |
| SC with admixture + nitrite | 61,2 | 165,4 | 172,7 | 156,7 | 402,8 | 112,0 |
| BC | 24,3 | 100,0 | 117,1 | 100,0 | 411,5 | 100,0 |
| BC with nitriteless admixture | 96,9 | 398,8 | 280,1 | 239,2 | 543,1 | 132,0 |
| BC with admixture + nitrite | 132,6 | 545,7 | 294,9 | 251,8 | 508,6 | 123,0 |

REMARK:
RHC = Rapid-Hardening Cement
RHC = Rapid-Hardening-Cement, submitted to a lengthy storage before use.
SC = Slag-cement.
BC = Belite-cement.

EXAMPLE 2

For a batch of 100 w.p. of slag- or belite-cement, 2 w.p. of bialuminium pentahydroxichloride are dosed, which are dissolved in the mixing-water and this solution embraces 4 w.p. of semihydrate gypsum, followed by 2 or 4 w.p. of hydrate-lime. With thus obtained mixture, a cement-sand mortar is prepared at a weight cement-to-sand ratio of 1:3 and water-to-cement ratio of 0,5. One of the belite-cement compounds comprises 6 w.p. of lime. At such an increase, the admixture can be dryly-added, i.e. without the use of mixture-water, mainly because the plasticity of the mortar is apt to decrease, thus impairing the process of forming. For comparison purpose, from the slag- and belite cemnts cement-sand mortar prisms are prepared by the same manner, the mass being water-mixed and admixtureless.

The sample-prisms, sized 4 × 4 × 16 cm are formed out of the cement-sand mortar with aid of a jolting-table. After their unmoulding, they are hardening in water until time of testing comes. The experimentally set data are shown on Table 2. These data are proving, that for the slow-hardening cements, having a lower lime-saturation, the increase of the lime-component of the admixture, leads in accordance with the method, to a considerable increase of the hardening-acceleration.

TABLE 2

Compression strength of cement/sand mortar 1:3 with water/cement ratio of 0,5 and an increased lime-component in the admixture

| Compound | 1 day kgf/cm² | % | 3 days kgf/cm² | % | 28 days kgf/cm² | % |
|---|---|---|---|---|---|---|
| SC | 37,0 | 100,0 | 110,2 | 100,0 | 359,6 | 100,0 |
| SC with admixture | 60,7 | 164,1 | 181,7 | 164,9 | 447,6 | 124,5 |
| SC with admixture and doubled lime-component | 67,2 | 181,6 | 181,1 | 164,3 | 406,2 | 113,0 |
| BC | 24,3 | 100,0 | 117,1 | 100,0 | 411,5 | 100,0 |
| BC with admixture | 79,0 | 325,1 | 248,3 | 212,0 | 541,9 | 131,7 |
| BC with admixture and doubled lime-component | 96,9 | 398,8 | 280,1 | 239,2 | 543,1 | 132,0 |
| BC with admixture and tripled lime-component | 123,9 | 509,9 | 283,8 | 242,4 | 537,7 | 130,7 |

REMARKS:
SC = Slag-cement
BC = Belite-cement
Lime-component - differently from the other compounds, here the admixture is dryly mixed with cement.

EXAMPLE 3

Here we shall consider the preparation of concrete with the following composition: RHC-to-aggregates = 1:6,5 with 300kg of RHC per cubic meter and a water-cement ratio of 0,56. One part of the concrete is batched with clean water, but the other — with water wherein the admixture is present, the latter being composed of 2 w.p. of bialuminium pentahydroxichloride, 0,22 w.p. of natrium nitrite (initially dissolved), 4 w.p. of semihydrate gypsum and 2 w.p. of hydrate lime. The materials, belonging to one of concrete-parts are not preheated and the temperature of the concrete-batch with or without admixture is 20° C. The materials of the remaining part of the concrete batch (with or without admixture) are warmed up to 50° C. The concrete-strength was tested with cubes, sized 15 × 15 × 15 cm.

Besides that, another concrete-batch is prepared with the following ratios: slag-cement-to -aggregates = 1:4,5 at a water-to-cement ratio = 0,42. One part of the concrete is batched with clean water, but the other is batched with water and an admixture comprising 2 w.p. of bilalumunium pantahydroxichloride, 0,22 w.p. of natrium nitrite (initially dissolved), 4 w.p. of semihydrate gypsum and 3 w.p. of hydrate lime. The concrete with or without admixture is prepared by means of materials-preheating by such a manner, taht the temperature of the concrete batch is 44° C. and 41,5° C. correspondingly. The concrete-strength is set by means of cubes, sized 15 × 15 × 15 cm.

The strengths shown on Table 3 are displaying that as soon as the fourth hour for the RHC, and the sixth hour for the slag-cement, the concrete — by applying the method — can be unmoulded, what many times rises the turn-over of the moulds, this in turn leading to a considerable acceleration of the productivity of the building operations.

TABLE 3

Compressive strength of concrete with and without preheating of the concrete - mixture.

| Compound | 4 hrs kgf/cm² | % | 8 hrs kgf/cm² | % | 1 day kgf/cm² | % | 28 days kgf/cm² | % |
|---|---|---|---|---|---|---|---|---|
| | Without preheating of the concrete-mixture | | | | | | | |
| RHC-300kg per 1cu.m. | | | | | | | | |

TABLE 3-continued

Compressive strength of concrete with and without preheating of the concrete - mixture.

| Compound | 4 hrs kgf/cm² | % | 8 hrs kgf/cm² | % | 1 day kgf/cm² | % | 28 days kgf/cm² | % |
|---|---|---|---|---|---|---|---|---|
| W/C ratio = 0,56; admixtureless at 20° C | — | — | 24 | 100,0 | 210 | 100,0 | 450 | 100,0 |
| RHC-300kg per 1cu.m. W/C ratio = 0,56; with admixture at 20° C | — | — | 59 | 245,8 | 317 | 151,0 | 511 | 113,6 |
| With concrete-mixture preheating | | | | | | | | |
| RHC-300kg per 1cu.m. W/C. ratio = 0,56; admixtureless at 50° C | 90 | 100,0 | — | — | 241 | 100,0 | 374 | 100, |
| RHC-300kg per 1cu.m. W/C ratio = 0,56; with admixture at 50° C | 148 | 164,4 | — (6 hrs) | — | 299 | 124,1 | 436 | 116, |
| SC-410kg per 1cu.m. W/C ratio = 0,42; admixtureless at 41,5° C | 26 | 100,0 | 57 | 100,0 | 167 | 100,0 | 348 | 100, |
| SC-410kg per 1cu.m. W/C ratio = 0,42 with admixture at 44° C | 60 | 230,8 | 122 | 214,0 | 294 | 176,0 | 503 | 144, |

NB
RHC — Rapidhardening cement
SC — Slag cement

EXAMPLE 4

A cement-sand mortar 1:3 with a water/cement ratio of 0,5 with or without admixture, comprising 2 w.p. of bialuminium pentahydroxichloride (initially dissolved), 4 w.p. of semi-hydrate gypsum and 2 w.p. of hydrate lime, supplied through the mixing water for 100 w.p. of RHC is formed, then together with the moulds is submitted to a heat-treatment at 50° C. or is hardened on the air at 20° C. The heat-treatment time is 6 hrs and the strength data obtained are shown on Table 4. These latter clearly display that the heat-treatment, in accordance with the method, is greatly accelerating the hardening of the cement-pastes, cement-sand mortars and concretes after their forming.

water/cement ratio of 0,56 is prepared with or without admixture, comprising in turn 2 w.p. of bialuminium pentahydroxichloride, 0,22 w.p. of natrium nitrite (initially dissolved), 4 w.p. of semihydrate gypsum and 2 w.p. of hydrate lime, wherein the admixture is supplied by the mixing water. After the forming of the concrete, the same is left to outdoor (open air) hardening at a temperature of 3°–5° C. until the term of testing expires. The strengths obtained are given on Table 5 and they clearly show that at the application of the method claimed, the first days are featuring a strength-increase of 1,6 to 1,9 times, i.e. even at such inopportune conditions the hardening of cement-pastes, cement-and-sand mortars or concretes is greatly accelerated after their forming.

TABLE 4

Compression strength of cement-sand mortar 1:3 with water/cement ratio (W/C) of 0,5; with and without heat-treating after its forming

| Compound | 6 hrs kgf/cm² | % | 8 hrs kgf/cm² | % | 16 hrs kgf/cm² | % | 28 hrs kgf/cm² | % |
|---|---|---|---|---|---|---|---|---|
| Hardening on the air at 20° C | | | | | | | | |
| RHC | — | — | 11,5 | 100 | 122,3 | 100 | 400,2 | 100 |
| RHC with admixture | — | — | 40,3 | 350,4 | 254,2 | 207,8 | 478,2 | 119, |
| Hardening by heat treatment at 50° C | | | | | | | | |
| RHC | 167,1 | 100,0 | — | — | — | — | 391,3 | 100,0 |
| RHC with admixture | 261,1 | 156,3 | — | — | — | — | 473,7 | 121,1 |

N.B.
RHC — Rapid-Hardening-Cement

EXAMPLE 5

A concrete, comprising RHC to aggregates ratio as 1:6,5, the amount of 300 kg RHC per 1 cubic meter, at

TABLE 5

Compression strength for concrete with 300kg RHC per 1 cubic meter water cement ratio od 0,56 and at hardening-temperature of 3 —5 Centigrades

| Compound | 1 day kgf/cm² | % | 3 days kgf/cm² | % | 28 days kgf/cm² | % |
|---|---|---|---|---|---|---|
| Admixtureless concrete | 37,6 | 100,0 | 165 | 100,0 | 430 | 100,0 |
| Concrete with admixture | 60,0 | 159,6 | 306 | 185,5 | 520 | 120,9 |

N.B.
RHC = Rapid-hardening-Concrete

EXAMPLE 6

Three brands of RHC, a brand of slag-cement, a brand of portland-pozzolana cement and a brand of portland or belite-cement are used to prepare cement mortars 1:3 with a water/cement ratio of 0,5 with or without admixture supplied by the mixing water and comprising in turn 2 w.p. of bialuminium pentahydroxichloride (initially dissolved), 4 w.p. of semi-hydrate gypsum, 2 w.p. of hydrate-lime, all this for 100 w.p. of cement. After their delivery from the moulds, the samples, sized 4 × 4 × 16 cm are hardening under water at 20° C. until the term of testing expires. The strength of the slag-cement is shown for a 1,33 fold increase of the admixture-amount. The strengths are given on Table 6.

TABLE 6

Compression strength of cement-sand mortar 1:3 with water-cement ratio of 0,5 with and without admixture. The latter is mixed with cement by means of the mixing-water.

| Compound | 1 day kgf/cm² | % | 3 days kgf/cm² | % | 28 days kgf/cm² | % |
|---|---|---|---|---|---|---|
| RHC | 182,4 | 100,0 | 382,8 | 100,0 | 509,6 | 100,0 |
| RHC + admixture | 340,7 | 186,8 | 497,7 | 130,0 | 607,5 | 119,2 |
| RHC* | 159,1 | 100,0 | — | — | 543,1 | 100,0 |
| RHC* + admixture | 293,2 | 184,3 | — | — | 635,9 | 117,1 |
| RHC** | 161,9 | 100,0 | 343,1 | 100,0 | 528,9 | 100,0 |
| RHC** admixture | 322,1 | 199,0 | 536,1 | 156,3 | 684,3 | 129,3 |
| SC | 30,0 | 100,0 | 99,1 | 100,0 | 390,6 | 100,0 |
| SC + admixture | 51,8 | 172,7 | 176,9 | 178,5 | 459,0 | 117,5 |
| SC + 1,33 times of admixture increase | 58,8 | 196,0 | — | — | 473,7 | 121,3 |
| PC | 22,7 | 100,0 | 106,6 | 100,0 | 326,7 | 100,0 |
| PC + admixture | 79,7 | 351,1 | 180,1 | 168,9 | 393,1 | 120,3 |
| BC | 24,3 | 100,0 | 117,1 | 100,0 | 411,5 | 100,0 |
| BC + admixture | 79,0 | 325,1 | 248,3 | 212,0 | 541,9 | 131,7 |

N.B.
RHC, RHC*, RHC** = Rapid-Hardening-Cement
SC = Slag-Cement
PC = Pozzolana-Cement
BC = Belite-Cement

TABLE 7

Compression strength of a concrete comprising RHC - 300 kg/1 m³ water/cement ratio of 0,56 - with or without admixture included

| Compound | 12 hrs kgf/cm² | % | 1 day kgf/cm² | % | 3 days kgf/cm² | % | 28 days kgf/cm² | % |
|---|---|---|---|---|---|---|---|---|
| Admixtureless, concrete Concrete | 95 | 100,0 | 210 | 100,0 | 333 | 100,0 | 450 | 100,0 |
| + admixture | 190 | 197,9 | 317 | 151,0 | 408 | 122,5 | 511 | 113,6 |
| Concrete + admixture, 1,33 times increased | 221 | 230,2 | 334 | 159,0 | — | — | 551 | 122,4 |

Table 7 shows the strength (by means of cubes sized 15 × 15 × 15 cm) of concrete, having the following composition and ratios RHC to aggregates = 1,6,5 with 300 kg of RHC per 1 cu.m. and a water/cement ratio of 0,56 at 20° C. for the hardening, with or without mixing water-supplied admixture. In the first case, the additive comprises 2 w.p. of bialuminium pentahydroxichloride, 0,22 w.p. of natrium nitrite (initially dissolved), 4 w.p. of semihydrate gypsum and 2 w.p. of hydrate-lime for 100 w.p. of RHC. In the second case, — 2,66 w.p. of bialuminium pentahydroxichloride, 0,29 w.p. of natrium nitrite (initially dissolved), 5,32 w.p. of semi-hydrate gypsum and 2,66 parts (w.p.) of hydrate-lime for 100 w.p. of RHC are involved.

The strength obtained gives a large possibility — when using the method of mixing-water supply of the admixture — to accelerate the hardening and to increase the strength either for cement/sand mortars, or for concretes in their early stage from 1,7 to 3,5 times, and, for their later stage — from 1,2 to 1,3 times.

EXAMPLE 7

With RHC, slag- and belite-cement are prepared cement-sand mortars 1:3 with a water/cement ratio of 0,5, with or without admixture, comprising 2 w.p. of bialuminium pentahydroxichloride, 4 w.p. of semi-hydrate gypsum and 2 w.p. of hydrate-lime for 100 w.p. of cement. The cements are mixed with the admixture dryly, i.e. before their water-stirring. After their delivery from the moulds, the samples sized 4 × 4 × 16 cm of cement/sand mortar are under-water set at 20° C. unless the term of tests expires.

For comparison purpose, the same size samples are prepared from the slag- and belite-cements - virtually by the same manner but without any admixture, while the RHC features an admixture, supplied by the mixing-water. The corresponding strengths are shown on Table 8. They are indicating that the method of the admixture dry-supply considerably accelerates the cement-hardening and provides their strength-increase, as it is the case with the admixture supply by means of mixing-water.

TABLE 8

Compression strength of cement/sand mortar 1:3 with water/cement ratio of 0,5. The admixture and the cement were dryly mixed

| Compound | 1 day kgf/cm² | % | 3 days kgf/cm² | % | 28 days kgf/cm² | % |
|---|---|---|---|---|---|---|
| RHC + admixture | 287,5 | 100,0 | 488, | 100,0 | 639,9 | 100,0 |
| RHC + admixture | 307,3 | 106,9 | 497,8 | 101,9 | 640,9 | 100,2 |
| SC | 37,3 | 100,0 | 118,7 | 100,0 | 370,2 | 100,0 |
| SC + admixture | 68,8 | 184,5 | 176,0 | 148,3 | 420,8 | 113, |
| BC | 24,3 | 100,0 | 117,1 | 100,0 | 411,5 | 100,0 |
| BC + admixture | 101,9 | 419,3 | 258,5 | 220,8 | 519,7 | 126,3 |

N.B.
RHC — Rapid-Hardening Cement
SC — Slag-cement
BC — Belite-cement
Admixture - for comparison, the admixture is supplied by the mixture-water.

What we claim is:

1. A method for accelerating the hardening and increasing the strength of cements which comprises admixing 100 parts by weight of the cements with water and an admixture comprising from 0.5 to 5 parts by weight of bialuminium pentahydroxychloride, 1 to 12 parts by weight of gypsum, 0.5 to 20 parts by weight of lime and up to 3 parts by weight of an alkali metal or an alkaline earth metal nitrite, at a temperature up to 60° C., and thereafter allowing the mixture to harden at a temperature up to 100° C.

2. A method according to claim 1 wherein the admixture is initially mixed with the cement and thereafter mixed with water.

3. A method according to claim 1 wherein the admixture is initially mixed with water, and thereafter mixed with cement.

4. A method according to claim 1 wherein the admixture is mixed with 100 parts by weight of rapid hardening cement.

5. A method according to claim 1 wherein the admixture is mixed with 100 parts by weight of slag-cement.

6. A method according to claim 1 wherein the admixture is mixed with 100 parts by weight of pozzdana-cement.

7. A method according to claim 1 wherein the admixture is mixed with 100 parts by weight of belite-cement.

* * * * *